US012640369B2

(12) United States Patent
Jung et al.

(10) Patent No.: US 12,640,369 B2
(45) Date of Patent: May 26, 2026

(54) LITHIUM NICKEL-BASED COMPOSITE OXIDE AS A POSITIVE ELECTRODE ACTIVE MATERIAL FOR RECHARGEABLE LITHIUM-ION BATTERIES

(71) Applicant: UMICORE, Brussels (BE)

(72) Inventors: KyungSub Jung, Chungcheongnam-do (KR); JiU Ann, Chungcheongnam-do (KR); Woon-Hyoung Ryu, Chungcheongnam-do (KR)

(73) Assignee: UMICORE, Brussels (BE)

( * ) Notice: Subject to any disclaimer, the term of this patent is extended or adjusted under 35 U.S.C. 154(b) by 261 days.

(21) Appl. No.: 18/561,509

(22) PCT Filed: May 27, 2022

(86) PCT No.: PCT/EP2022/064453
§ 371 (c)(1),
(2) Date: Nov. 16, 2023

(87) PCT Pub. No.: WO2022/248689
PCT Pub. Date: Dec. 1, 2022

(65) Prior Publication Data
US 2024/0250257 A1    Jul. 25, 2024

Related U.S. Application Data

(60) Provisional application No. 63/193,746, filed on May 27, 2021.

(30) Foreign Application Priority Data

May 28, 2021    (EP) .................................... 21176465

(51) Int. Cl.
*H01M 4/525*        (2010.01)
*C01G 53/50*        (2025.01)

(52) U.S. Cl.
CPC ............ *H01M 4/525* (2013.01); *C01G 53/50* (2013.01); *C01P 2002/52* (2013.01); *C01P 2002/85* (2013.01); *C01P 2004/84* (2013.01); *C01P 2006/40* (2013.01)

(58) Field of Classification Search
CPC ..... H01M 4/525; C01G 53/82; C01P 2002/85
See application file for complete search history.

(56) References Cited

U.S. PATENT DOCUMENTS

| | | | |
|---|---|---|---|
| 2011/0260099 A1* | 10/2011 | Paulsen | B82Y 30/00 |
| | | | 252/182.1 |
| 2015/0249248 A1 | 9/2015 | Ishizaki et al. | |
| 2018/0316008 A1 | 11/2018 | Arimura et al. | |
| 2019/0123347 A1 | 4/2019 | Kim et al. | |
| 2021/0328212 A1 | 10/2021 | Hu et al. | |
| 2022/0069300 A1 | 3/2022 | Tochio et al. | |

FOREIGN PATENT DOCUMENTS

| | | | |
|---|---|---|---|
| CN | 1516303 A | 7/2004 | |
| CN | 109742336 A | 5/2019 | |
| CN | 109755524 A | 5/2019 | |
| CN | 110707297 A | 1/2020 | |
| EP | 3331067 B1 | 6/2018 | |
| JP | 2016184472 A | 10/2016 | |
| KR | 20190079526 A | 7/2019 | |
| WO | 2011071068 A1 | 6/2011 | |
| WO | 2014061653 A1 | 4/2014 | |
| WO | 2017078136 A1 | 5/2017 | |
| WO | 2020158420 A1 | 8/2020 | |
| WO | 2021001501 A1 | 1/2021 | |
| WO | 2021001501 A2 | 1/2021 | |

OTHER PUBLICATIONS

JPO: Notice of Reasons for Rejection for Japanese Patent Application No. 2023-572900, mailed Jan. 14, 2025, 3 pages.
ISA/EP; International Search Report and Written Opinion for International Patent Application No. PCT/EP2022/064453 dated Sep. 5, 2022, 9 pages.
Sim, Seong-Ju, et al., "Effects of lithium tungsten oxide coating on LiNi0.90Co0.05Mn0.0502 cathode material for lithium-ion batteries", Journal of Power Sources, 2021, pp. 1-6, vol. 481, No. 229037.
Korean Intellectual Propery Office: Office Action issued in corresponding Korean Patent Application No. 10-2023-7044940, mailed Aug. 6, 2025, with English Translation, 19 pages.
China National Intellectual Property Administration: English Translation of Notification of First Office Action and Search Report issued in corresponding Chinese Patent Application No. 202280037179.0, mailed Aug. 28, 2025, 9 pages.

* cited by examiner

*Primary Examiner* — Khanh T Nguyen

(74) *Attorney, Agent, or Firm* — Rimon P.C.; Allyn B. Elliott

(57) ABSTRACT

The present invention relates to a lithium nickel-based oxide positive electrode active material for lithium-ion secondary batteries suitable for electric vehicle and hybrid electric vehicle applications, comprising lithium transition metal-based oxide particles comprising zirconium, and a preparation method for said positive electrode material.

15 Claims, No Drawings

LITHIUM NICKEL-BASED COMPOSITE OXIDE AS A POSITIVE ELECTRODE ACTIVE MATERIAL FOR RECHARGEABLE LITHIUM-ION BATTERIES

CROSS-REFERENCE TO RELATED APPLICATIONS

This application is a U.S. National Stage application of International Patent Application No. PCT/EP2022/064453, filed on May 27, 2022, which claims the benefit of U.S. Provisional Patent Application No. 63/193,746, filed on May 27, 2021, and European Patent Application No. 21176465.9, filed on May 28, 2021.

TECHNICAL FIELD AND BACKGROUND

The present invention relates to a lithium nickel-based oxide positive electrode active material for lithium-ion secondary batteries (LIBs) suitable for electric vehicle (EV) and hybrid electric vehicle (HEV) applications, comprising lithium transition metal-based oxide particles comprising zirconium, and a preparation method for said positive electrode material.

A positive electrode active material is defined as a material which is electrochemically active in a positive electrode. By active material, it must be understood a material capable to capture and release Li ions when subjected to a voltage change over a predetermined period of time.

It is therefore an object of the present invention to provide a positive electrode active material having one or more improved properties, such as no or reduced bulging (i.e. increase in full cell thickness) and increased cycle life and increased life cycle when used in a full cell.

SUMMARY OF THE INVENTION

This objective is achieved by providing a positive electrode active material for lithium-ion batteries, wherein the positive electrode active material comprises Li, M', and O, wherein M' consists of:

Ni in a content x between 60.0 mol % and 95.0 mol %, relative to M',

Co in a content y, wherein $0 \leq y \leq 40.0$ mol %, relative to M',

Mn in a content z, wherein $0 \leq z \leq 70.0$ mol %, relative to M',

W in a content a, wherein $0 \leq a \leq 4.0$ mol %, relative to M',

Zr in a content b between 0.01 mol % and 0.20 mol %, relative to M', elements other than Li, O, Ni, Co, Mn, W, Al, S and Zr in a content c, wherein $0 \leq C \leq 2.0$ mol %, relative to M', and, S in a content d, wherein $0.01 \leq d \leq 3.0$ mol %, relative to M', Al in a content e wherein $0 \leq e \leq 2.0$ mol %, relative to M', wherein x, y, z, a, b, c, d and e are measured by ICP, wherein x+y+z+a+b+c+d+e is 100.0 mol %, wherein the positive electrode active material has a S content $S_A$ defined as $$\frac{d}{(x+y+z+a+d)},$$

wherein the positive electrode active material has a S content $S_B$ determined by XPS analysis, wherein $S_B$ is expressed as molar fraction compared to the sum of molar fractions of Co, Mn, Ni, W, and S as measured by XPS analysis, wherein the ratio $S_B/S_A > 1.0$.

In the framework of the present invention, ppm means parts-per-million for a unit of concentration, expressing 1 ppm=0.0001 wt %.

Another aspect is a positive electrode active material powder for lithium-ion rechargeable batteries, wherein the positive electrode active material comprises Li, M', and O, wherein M' consists of:

Ni in a content x between 60.0 mol % and 95.0 mol %, relative to M',

Co in a content y, wherein $0 \leq y \leq 40.0$ mol %, relative to M',

Mn in a content z, wherein $0 \leq z \leq 70.0$ mol %, relative to M',

W in a content a between 0.01 mol % and 4.0 mol %, relative to M',

Zr in a content b between 0.01 mol % and 0.20 mol %, relative to M', elements other than Li, O, Ni, Co, Mn, W, Al, S and Zr in a content c, wherein $0 \leq c \leq 2.0$ mol %, relative to M', and, S in a content d, wherein $0.00 \leq d \leq 3.0$ mol %, relative to M', Al in a content e wherein $0 \leq e \leq 2.0$ mol %, relative to M', wherein x, y, z, a, b, c, d and e are measured by ICP, wherein x+y+z+a+b+c+d+e is 100.0 mol %, wherein the positive electrode active material has a W content WA defined as a/((x+y+z+a+d)), wherein the positive electrode active material has a W content WB determined by XPS analysis, wherein WB is expressed as molar fraction compared to the sum of molar fractions of Co, Mn, Ni, W, and S as measured by XPS analysis, wherein the ratio WB/WA > 1.0.

The present invention concerns the following embodiments:

Embodiment 1

In a first aspect, the present invention concerns a positive electrode active material for lithium-ion batteries, wherein the positive electrode active material comprises Li, M', and O, wherein M' consists of:

Ni in a content x between 60.0 mol % and 95.0 mol %, relative to M',

Co in a content y, wherein $0 \leq y \leq 40.0$ mol %, relative to M',

Mn in a content z, wherein $0 \leq z \leq 70.0$ mol %, relative to M',

W in a content a, wherein $0 \leq a \leq 4.0$ mol %, relative to M',

Zr in a content b between 0.01 mol % and 0.20 mol %, relative to M', elements other than Li, O, Ni, Co, Mn, W, Al, S and Zr in a content c, wherein $0 \leq c \leq 2.0$ mol %, relative to M', and, S in a content d, wherein $0.01 \leq d \leq 3.0$ mol %, relative to M', Al in a content e wherein $0 \leq e \leq 2.0$ mol %, relative to M', wherein x, y, z, a, b, c, d and e are measured by ICP, wherein x+y+z+a+b+c+d+e is 100.0 mol %, wherein the positive electrode active material has a S content $S_A$ defined as $$\frac{d}{(x+y+z+a+d)},$$

wherein the positive electrode active material has a S content $S_B$ determined by XPS analysis, wherein $S_B$ is expressed as molar fraction compared to the sum of molar fractions of Co, Mn, Ni, W, and S as measured by XPS analysis,
wherein the ratio $S_B/S_A > 1.0$.
Preferably, $S_B/S_A > 2.0$.

Preferably, the positive electrode material of the present invention comprises 0.01 mol %≤a≤4.0 mol %, wherein the positive electrode active material has a W content $W_A$ defined as $$\frac{a}{(x+y+z+a+d)},$$

wherein the positive electrode active material has a W content $W_B$ determined by XPS analysis, wherein $W_B$ is expressed as molar fraction compared to the sum of molar fractions of Co, Mn, Ni, W, and S as measured by XPS analysis,
wherein the ratio $W_B/W_A > 1.0$.

Preferably, the Ni in a content x≥65.0 mol %, more preferably x≥70.0 mol %, even more preferably x≥75.0 mol %, and most preferably x≥80.0 mol %, relative to M'.

Preferably, the Ni in a content x≤93.0 mol %, more preferably x≤91.0 mol % and most preferably x≤90.0 mol % %, relative to M'.

Preferably, the Co in a content y>0 mol %, more preferably y>1.0 mol % and even more preferably y≥5.0 mol %, relative to M'.

Preferably, the Co in a content y≤35 mol %, more preferably y≤30.0 mol % and most preferably y≤20.0 mol % %, relative to M'.

Preferably, the Mn in a content z>0 mol % and more preferably z≥1.0 mol and even more preferably z≥5.0 mol %, relative to M'.

Preferably, the Mn in a content z≤65 mol %, more preferably z≤60.0 mol % and most preferably z≤50.0 mol % %, relative to M'.

In another embodiment, said Ni in a content x is between 70 mol % and 91 mol % relative to M', said Co in a content y is between 0.0 mol % and 30.0 mol % relative to M' and said Mn in a content z is between 0.0 mol % and 50.0 mol % relative to M'.

In another embodiment, the W in a content a is between 0.10 mol % and 3.00 mol %, relative to M'.

Embodiment 2

In a second aspect, preferably according to the Embodiment 1, the present invention concerns a positive electrode active material powder for lithium-ion rechargeable batteries, wherein the positive electrode active material comprises Li, M', and O, wherein M' consists of:
Ni in a content x between 60.0 mol % and 95.0 mol %, relative to M',
Co in a content y, wherein 0≤y≤40.0 mol %, relative to M', Mn in a content z, wherein 0≤z≤70.0 mol %, relative to M',
W in a content a between 0.01 mol % and 4.0 mol %, relative to M',
Zr in a content b between 0.01 mol % and 0.20 mol %, relative to M',
elements other than Li, O, Ni, Co, Mn, W, Al, S and Zr in a content c, wherein 0≤c≤2.0 mol %, relative to M', and,
S in a content d, wherein 0.00≤d≤3.0 mol %, relative to M',
Al in a content e wherein 0≤e≤2.0 mol %, relative to M',
wherein x, y, z, a, b, c, d and e are measured by ICP,
wherein x+y+z+a+b+c+d+e is 100.0 mol %,
wherein the positive electrode active material has a W content $W_A$ defined as $$\frac{a}{(x+y+z+a+d)},$$

wherein the positive electrode active material has a W content $W_B$ determined by XPS analysis, wherein $W_B$ is expressed as molar fraction compared to the sum of molar fractions of Co, Mn, Ni, W, and S as measured by XPS analysis,
wherein the ratio $W_B/W_A > 1.0$.

Preferably, the positive electrode active material comprises 0.01 mol %≤d≤3.0 mol %, wherein the positive electrode active material has a S content $S_A$ defined as $$\frac{d}{(x+y+z+a+d)},$$

wherein the positive electrode active material has a S content $S_B$ determined by XPS analysis, wherein $S_B$ is expressed as molar fraction compared to the sum of molar fractions of Co, Mn, Ni, W, and S as measured by XPS analysis,
wherein the ratio $S_B/S_A > 1.0$.

Preferably, the Ni in a content x≥65.0 mol %, more preferably x≥70.0 mol %, even more preferably x≥75.0 mol %, and most preferably x≥80.0 mol %, relative to M'.

Preferably, the Ni in a content x≤93.0 mol %, more preferably x≤91.0 mol % and most preferably x≤90.0 mol % %, relative to M'.

Preferably, the Co in a content y>0 mol %, more preferably y≥1.0 mol % and even more preferably y≥5.0 mol %, relative to M'.

Preferably, the Co in a content y≤35 mol %, more preferably y≤30.0 mol % and most preferably y≤20.0 mol % %, relative to M'.

Preferably, the Mn in a content z>0 mol % and more preferably z≥1.0 mol and even more preferably z≥5.0 mol %, relative to M'.

Preferably, the Mn in a content z≤65 mol %, more preferably z≤60.0 mol % and most preferably z≤50.0 mol % %, relative to M'.

In another embodiment, said Ni in a content x is between 70 mol % and 91 mol % relative to M', said Co in a content y is between 0.0 mol % and 30.0 mol % relative to M' and said Mn in a content z is between 0.0 mol % and 50.0 mol % relative to M'.

In another embodiment, the W in a content a is between 0.10 mol % and 3.00 mol %, relative to M'.

Embodiment 3

In a third embodiment, preferably according to the Embodiment 1 to 2, said positive electrode active material comprises Zr in a content b between 0.10 mol % and 0.2 mol %, relative to M'.

Embodiment 4

In a fourth embodiment, preferably according to the Embodiments 1 to 3, said positive electrode active material comprises Al in a content e between 0.10 mol % and 2.00 mol %, relative to M'.

Embodiment 5

In a fifth embodiment, preferably according to the Embodiments 1 to 4, said positive electrode active material comprises elements other than Li, O, Ni, Co, Mn, W, Al and S comprise at least one element of the group consisting of: B, Ba, Ca, Cr, F, Fe, Mg, Mo, Nb, Si, Sr, Ti, Y, V, and Zn.

In another embodiment, preferably the positive electrode active material according to any of the previous claims, wherein said elements other than Li, O, Ni, Co, Mn, W, Al and S are at least one element of the group consisting of: B, Ba, Ca, Cr, F, Fe, Mg, Mo, Nb, Si, Sr, Ti, Y, V, and Zn.

Embodiment 6

In a sixth aspect, the present invention also includes a process for the manufacturing of a positive electrode active material according to any of the Embodiments 1 to 5, wherein said process comprises the steps of:

preparing a lithium transition metal-based oxide compound, mixing said lithium transition metal-based oxide compound with a source of a sulfur, and with water, thereby obtaining a mixture, and heating the mixture in an oxidizing atmosphere in a furnace at a temperature between 350° C. and less than 500° C., thereby obtaining the positive electrode active material.

In one embodiment, preferably in the process according to the present invention a source of tungsten is added together with the source of sulfur in the mixing step.

Preferably, the source of tungsten can be selected from, but not limited to: tungsten oxide and lithium tungsten oxide.

Preferably, the content of W is between 100 ppm to 10000 ppm with respect to the total weight of the positive electrode active material. More preferably, tungsten content is between 1000 ppm to 8000 ppm.

Preferably, the source of the sulfur is selected from but not limited to: $Al_2(SO_4)_3$, sulfate salt, and/or $H_2SO_4$, and more preferably $Al_2(SO_4)_3$.

Preferably, the content of S is between 350 ppm to 3500 ppm with respect to the total weight of the positive electrode active material. More preferably, S content is between 400 ppm to 3000 ppm.

Preferably, said heating temperature is at most 450° C.

Preferably, said heating time is for a time between 1 hour and 20 hours.

Preferably, a lithium transition metal oxide indicated material is prepared from the lithiation process, that is the process wherein a mixture of transition metal bearing precursor and lithium source is heated at a temperature of at least 500° C.

Preferably, the transition metal bearing precursor comprises nickel, cobalt and/or manganese. Typically, the transition metal bearing precursor is prepared by the precipitation by methods known in the art.

Preferably, in this embodiment, the lithium transition metal oxide comprises Zr, wherein the source of Zr is mixed together with Li source during lithiation.

Preferably, the source of zirconium can be selected from but not limited to zirconium oxide and lithium zirconium oxide.

Preferably, the content of Zr is between 100 ppm to 2500 ppm with respect to the total weight of the positive electrode active material. More preferably, the zirconium content is between 200 ppm to 2200 ppm.

Embodiment 7

In a seventh aspect, the present invention concerns a use of the positive electrode active material according to any of the preceding Embodiments 1 to 6 in a battery.

Said battery is a rechargeable lithium-ion battery comprising a cathode, an anode, a separator, and electrolyte. Preferably, the electrolyte is a non-aqueous liquid electrolyte. The positive electrode active material in this invention is used in the positive electrode.

The present invention also concerns the use of the battery according to present invention in an electric vehicle or in a hybrid electric vehicle.

DETAILED DESCRIPTION

In the following detailed description, preferred embodiments are described so as to enable the practice of the invention. Although the invention is described with reference to these specific preferred embodiments, it will be understood that the invention is not limited to these preferred embodiments. The invention includes numerous alternatives, modifications and equivalents that are apparent from consideration of the following detailed description and accompanying drawings.

A) ICP Analysis

The Li, Ni, Mn, Co, S, W, Al, and Zr contents of the positive electrode active material powder are measured with the Inductively Coupled Plasma (ICP) method by using an Agillent ICP 720-ES. 2 grams of product powder sample is dissolved into 10 ml of high purity hydrochloric acid in an Erlenmeyer flask. The flask is covered by a glass and heated on a hot plate at 380° C. until complete dissolution of the precursor. After being cooled to room temperature, the solution of the Erlenmeyer flask is poured into a 250 mL volumetric flask. Afterwards, the volumetric flask is filled with deionized water up to the 250 mL mark, followed by complete homogenization. An appropriate amount of solution is taken out by pipette and transferred into a 250 mL volumetric flask for the $2^{nd}$ dilution, where the volumetric flask is filled with internal standard and 10% hydrochloric acid up to the 250 mL mark and then homogenized. Finally, this 50 mL solution is used for ICP measurement.

B) Particle Size Distribution

The particle size distribution (PSD) of the positive electrode active material powder is measured by laser diffraction particle size analysis using a Malvern Mastersizer 3000 with a Hydro MV wet dispersion accessory after having dispersed each of the powder samples in an aqueous medium. In order to improve the dispersion of the powder, sufficient ultrasonic irradiation and stirring is applied, and an appropriate surfactant is introduced. D50 is defined as the particle size at 50% of the cumulative volume % distributions obtained from the Malvern Mastersizer 3000 with Hydro MV measurements.

C) Full Cell Testing

C1) Full Cell Preparation 2000 mAh pouch-type cells are prepared as follows: the positive electrode active material powder, Super-P (Super-P, Timcal, (Imerys Graphite & Carbon) as positive electrode conductive agents, and polyvinylidene fluoride (PVDF S5130, Solvay) as a positive electrode binder are added to N-methyl-2-pyrrolidone (NMP) as a dispersion medium so that the mass ratio of the positive electrode active material powder, the positive electrode conductive agents: super P: positive electrode binder is set at 95/3/2. Thereafter, the mixture is kneaded to prepare a positive electrode mixture slurry. The resulting positive electrode mixture slurry is then applied onto both sides of a positive electrode current collector, made of a 20 μm thick aluminum foil. The width of the applied area is 88.5 mm and the length is 425 mm. Typical loading weight of a positive electrode active material is about 15.3±1 mg/cm². The electrode is then dried and calendared using a pressure of 4.5 MPa. In addition, an aluminum plate serving as a positive electrode current collector tab is arc-welded to an end portion of the positive electrode.

Commercially available negative electrodes are used. In short, a mixture of natural graphite, carbon, carboxy-methyl-cellulose-sodium (CMC), and styrene-butadiene-rubber (SBR), in a mass ratio of 95.5/1/1.5/2, is applied on both sides of a copper foil. A nickel plate serving as a negative electrode current collector tab is arc-welded to an end portion of the negative electrode. Typical loading weight of a negative electrode active material is about 10±1 mg/cm².

Non-aqueous electrolyte is obtained by dissolving lithium hexafluorophosphate (LiPF$_6$) salt at a concentration of 1.2 mol/L in a mixed solvent of ethylene carbonate (EC), ethyl methyl carbonate (EMC), and diethyl carbonated (DEC) in a volume ratio of 1:1:1. It contains 1.0 wt. % lithium difluorophosphate (LiPO$_2$F$_2$), and 1.0 wt. % vinylene carbonate (VC) as additives.

A sheet of the positive electrode, a sheet of the negative electrode, and a sheet of the microporous polymer separator (13 μm) interposed between them are spirally wound using a winding core rod in order to obtain a spirally wound electrode assembly. The assembly and the electrolyte are then put in an aluminum laminated pouch in an air-dry room with dew point of −50° C., so that a flat pouch-type lithium secondary battery is prepared. The design capacity of the secondary battery is 2000 mAh when charged to 4.20 V. The full cell testing procedure uses a 1 C current definition of 2000 mA/g.

C2) Bulging Test 2000 mAh pouch-type batteries prepared by above preparation method are fully charged until 4.2V and inserted in an oven which is heated to 90° C., then stays for 20 hours. At 90° C., the charged positive electrode reacts with an electrolyte and creates gas. The evolved gas creates a bulging. The increase of thickness ((thickness after storage-thickness before storage)/thickness before storage*100%) is measured after 20 hours.

C3) Cycle Life Test

A. Pre-Charging and Formation

The non-aqueous electrolyte solution is impregnated into the prepared dry battery for 8 hours at room temperature.

The battery is pre-charged with the current of 0.25 C until 15% of its theoretical capacity and aged for a day at room temperature. The battery is then degassed using a pressure of −760 mmHg for 30 seconds, and the aluminum pouch is sealed.

The battery is charged with a current of 0.2 C in CC mode (constant current) up to 4.2 V or 4.3 V and CV mode (constant voltage) until a cut-off current of C/20 is reached. The battery is discharged with a current of 0.2 C in CC mode down to 2.7 V. Then, it is fully charged with a current of 0.50 C in CC mode up to 4.2 V or 4.3 V and CV mode until a cut-off current of C/20 is reached.

Afterwards, cell is discharged with a current of 0.50 C in CC mode down to 2.7 V. It is again charged with a current of 0.5 C in CC mode up to 4.2 V or 4.3 V and CV mode until a cut-off current of C/20 is reached. The final charging step is done in 25° C.

B. Cycle Life Test

The lithium secondary full cell batteries are charged and discharged continuously under the following conditions, both at 45° C., to determine their charge-discharge cycle performance:

Charge is performed in CC mode under 1 C rate up to 4.2 V, then CV mode until C/20 is reached, The cell is then set to rest for 10 minutes, Discharge is done in CC mode at 1 C rate down to 2.7 V, The cell is then set to rest for 10 minutes, The charge-discharge cycles proceed until 800 or 1000 cycles. Every 100 cycles, the discharge is done at 0.1 C rate in CC mode down to 2.7 V.

The retained capacity at the nth cycle is calculated as the ratio of the discharge capacity obtained at cycle n to cycle 1.

The cycle life is defined as the number of charge-discharge cycles when the capacity degrades to 80%.

D) X-Ray Photoelectron Spectroscopy (XPS) Analysis

In the present invention, X-ray photoelectron spectroscopy (XPS) is used to analyze the surface of positive electrode active material powder particles. In XPS measurement, the signal is acquired from the first few nanometers (e.g. 1 nm to 10 nm) of the uppermost part of a sample, i.e. surface layer. Therefore, all elements measured by XPS are contained in the surface layer.

For the surface analysis of positive electrode active material powder particles, XPS measurement is carried out using a Thermo K−α+ spectrometer (Thermo Scientific, https://www.thermofisher.com/order/catalog/product/IQLAAD-GAAFFACVMAHV). Monochromatic Al Kα radiation (hv=1486.6 eV) is used with a spot size of 400 μm and measurement angle of 45°. A wide survey scan to identify elements present at the surface is conducted at 200 eV pass energy. C1s peak having a maximum intensity (or centered) at a binding energy of 284.8 eV is used as a calibrate peak position after data collection. Accurate narrow scans are performed afterwards at 50 eV for at least 10 scans for each identified element to determine the precise surface composition.

Curve fitting is done with CasaXPS Version 2.3.19PR1.0 (Casa Software, http://www.casaxps.com/) using a Shirley-type background treatment and Scofield sensitivity factors. The fitting parameters are according to Table 1a. Line shape GL(30) is the Gaussian/Lorentzian product formula with 70% Gaussian line and 30% Lorentzian line. LA(α, β, m) is an asymmetric line-shape where a and B define tail spreading of the peak and m define the width.

TABLE 1a

| | | XPS fitting parameter for Ni2p3, Mn2p3, Co2p3, W4f, and S2p. | | |
|---|---|---|---|---|
| Element | Sensitivity factor | Fitting range (eV) | Defined peak(s) | Line shape |
| Ni | 14.61 | 851.3 ± 0.1-869.4 ± 0.1 | Ni2p3, Ni2p3 satellite | LA(1.33, 2.44, 69) |
| Mn | 9.17 | 639.9 ± 0.1-649.5 ± 0.1 | Mn2p3, Mn2p3 satellite | GL(30) |
| Co | 12.62 | 775.8 ± 0.4-792.5 ± 0.4 | Co2p3-1, Co2p3-2, Co2p3 satellite | GL(30) |
| W | 9.80 | 29.0-45.0 | W4f7, W4f5, W4f loss | GL(30) |
| S | 1.677 | 162.5 ± 0.1-174.2 ± 0.1 | S2p3, S2p1 | GL(30) |

For Co, W, and S peaks, constraints are set for each defined peak according to Table 1b. W5p3 is not quantified.

TABLE 1b

| | | XPS fitting constraints | | |
|---|---|---|---|---|
| Element | Defined peak | Fitting range (eV) | FWHM (eV) | Area |
| Co | Co2p3-1 | 776.0-780.9 | 0.5-4.0 | No constraint set |
| | Co2p3-2 | 781.0-785.0 | 0.5-4.0 | No constraint set |
| | Co2p3 satellite | 785.1-792.0 | 0.5-6.0 | No constraint set |
| W | W4f7 | 33.0-36.0 | 0.2-4.0 | No constraint set |
| | W4f5 | 36.1-39.0 | | Same as 75% of W4f7 area W4f7 |
| | W5p3 | 39.1-43.0 | 0.5-2.5 | No constraint set |
| S | S2p3 peak | 167.0-170.0 | | No constraint set |
| | S2p1 peak | 170.0-172.0 | | Same as 50% of S2p3 area S2p3 |

The S and W, surface contents as determined by XPS are expressed as a molar fraction of S and W, in the surface of the particles divided by the total content of Ni, Mn, Co, and W, in said surface. They are calculated as follows:

$$\text{fraction of } W = W_B = \frac{W\,(\text{mol \%})}{\begin{array}{l}Ni\,(\text{mol \%}) + Mn\,(\text{mol \%}) + \\ Co\,(\text{mol \%}) + W\,(\text{mol \%}) + S\,(\text{mol \%})\end{array}}$$

$$\text{fraction of } S = S_B = \frac{S\,(\text{mol \%})}{\begin{array}{l}Ni\,(\text{mol \%}) + Mn\,(\text{mol \%}) + \\ Co\,(\text{mol \%}) + W\,(\text{mol \%}) + S\,(\text{mol \%})\end{array}}$$

The invention is further illustrated by the following (non-limitative) examples:

Comparative Example 1.1 (CEX 1.1)

CEX 1.1 was obtained through a solid-state reaction between a lithium source and a transition metal-based source precursor running as follows:

1. Precursor preparation: The precipitation process of precursor was performed in a reactor with a liquid volume of 10 L using an overflow tube and an impeller motor of 400 W. The impeller of 10 cm diameter was stirred at 800 RPM. The reactor had 4 baffles to allow vigorous stirring. A flow of 50 L/h of nitrogen gas was applied above the liquid level to avoid oxidation due to the vigorous stirring. Three solutions containing nickel, manganese, and cobalt sulfate (NiSO₄, MnSO₄, CoSO₄) with a total concentration of 110 g/L metal were prepared to yield a mixed MeSO₄ solution, wherein Me consists of Ni, Mn, and Co. The first solution had a Ni:Mn:Co molar ratio of 87:5:8, and the second solution had a molar ratio of 0:5:95. A solution of 400 g/L NaOH and an undiluted ammonia solution of 25% were used. Total metal composition of precursor was $Ni_{0.85}Mn_{0.05}Co_{0.10}$ which was prepared in process S1 to S3:

a. S1-seed preparation: A $Ni_{0.87}Mn_{0.05}Co_{0.08}(OH)_2$ seed precursors were prepared using a typical co-precipitation in a Continuous Stirred Tank Reactor (CSTR), having a specific residence time of 6 hours. At the start the reactor was filled with water and ammonia to get a 15 g/L of ammonia solution inside. The temperature in the reactor was 60° C. After the reactor was filled with the starting solution, the different reagents (MeSO₄ solution, NaOH solution, NH₃ solution) were pumped simultaneously in the reactor at different injection points, keeping the ammonia to metal ratio of 1:1 and keeping the pH around 11.7. There should be more than 2 OH⁻ ions for each metal ion in the solution during the precipitation reaction. After 24 hours, the reactor was in steady state and the D50 was between 5 μm and 20 μm, and the slurry from the overflow was collected. The precipitated metal hydroxides were washed, filtered under a protective atmosphere to remove the dissolved salts and ammonia. 200 grams of the wet cake was re-pulped in 1 L water and treated with a mechanical pulverization by ball mill. This treatment reduced the D50 size to less than 2 μm.

b. S2-precipitation of the core particles: A $Ni_{0.87}Mn_{0.05}Co_{0.08}(OH)_2$ core precursors were prepared using a modified co-precipitation in a Continuous Stirred Tank Reactor (CSTR), having a specific or average residence time of 3 hours. The MeSO₄ first solution compositions were used. At the start the reactor was filled with water and ammonia to get a 15 g/L of ammonia solution inside. The temperature in the reactor was 60° C. After the reactor was filled with the starting solution, different reagents (MeSO₄ solution, NaOH solution, NH₃ solution) were pumped simultaneously in the reactor at different injection points, keeping the ammonia to metal ratio of 1:1 and keeping the pH around 11.7 with the NaOH solution. Typically, there should be more than 2 OH⁻ ions for each metal ion in the solution. After 6 hours, 100 grams of seeds from S1 were added to the reactor. The particle size span in the reactor immediately became large and the D50 became small. After at least 6 hours the span decreased steadily to a value below 0.9. At this point the particles have grown to around 6-11 μm. The slurry in the overflow was now collected in a beaker of 3 L and the particles were allowed to settle in the beaker.

The beaker was decanted each 30 minutes, and the slurry was put back into the reactor. The dosing of the reagents was stopped when the particles reach a sufficient size (around 11 μm).

c. S3-precipitation of the shell: The metal sulfate solution (MeSO$_4$) dosed to the reactor in S2 was switched to the second MeSO$_4$ solution. The dosing of all chemicals was re-started, and the overflow was collected in a 3 L beaker. Every 30 minutes the beaker was decanted to remove filtrate and the slurry was put back into the reactor. This practice was continued until the shell with the desired thickness was grown using this procedure. The precipitated metal (oxy-)hydroxides were washed and filtered under protective atmosphere to remove the dissolved salts and ammonia. The wet cake was dried in a furnace at 150° C. under nitrogen. The final core-shell precipitated metal (oxy-)hydroxide precursors had a Ni:Mn:Co core composition of 87:5:8 and a Ni:Mn:Co shell composition of 0:5:95. The average metal composition of precursor as determined ICP analysis was Ni:Mn:Co=85:5:10 (in mol %). Important factors like pH, stirring rate, chemical concentration, and temperature were delicately controlled during precipitation process to maintain a constant final product composition. The thickness of the shell could be calculated based on the process conditions, but also measured afterwards using advanced analysis instruments such as XPS depth profiling or even TEM.

2. Mixing: Precursor prepared from Step 1) was mixed with LiOH in an industrial blender with Li to metal mol ratio (Li/Me) of 1.02 with respect to the total weight of precursor.

3. Heating: The mixture obtained from step 2) was heated at 765° C. under an oxygen atmosphere for 12 hours followed by grinding and sieving to obtain a heated powder having composition of Ni:Mn:Co=87:5:8 (in mol %), as determined by ICP analysis, and D50 of around 11.5 μm, as determined by PSD analysis.

4. Mixing: The heated powder was mixed with aluminum sulfate solution, which was prepared by dissolving 6300 ppm Al$_2$(SO$_4$)$_3$ powder into 3.5 wt. % of deionized water with respect to the weight of the heated powder 5. Heating: The mixture obtained from Step 4) was heated at 385° C. for 8 hours under an oxygen atmosphere followed by grinding and sieving so as to obtain CEX 1.1.

Comparative Example 1.2 (CEX 1.2)

CEX 1.2 was prepared according to the same method as CEX 1.1 except that 4000 ppm WO$_3$ was added in the step 4 together with 6300 ppm Al$_2$(SO$_4$)$_3$.

Example 1.1 (EX 1.1)

EX 1.1 was prepared according to the same method as CEX 1.1 except that 1000 ppm Zr from ZrO$_2$ was added in the Step 2 together with LiOH and 4000 ppm W from WO$_3$ was added in the step 4 together with 6300 ppm Al$_2$(SO$_4$)$_3$.

Example 1.2 (EX 1.2)

EX 1.2 was prepared according to the same method as CEX 1.1 except that 2000 ppm Zr from ZrO$_2$ was added in the Step 2 together with LiOH and 4000 ppm W from WO$_3$ was added in the step 4 together with 6300 ppm Al$_2$(SO$_4$)$_3$.

Comparative Example 2 (CEX 2)

EX 1.2 was prepared according to the same method as CEX 1.1 except that 3000 ppm Zr from ZrO$_2$ was added in the Step 2 together with LiOH and 4000 ppm W from WO$_3$ was added in the step 4 together with 6300 ppm Al$_2$(SO$_4$)$_3$.

TABLE 2

Summary of the composition and the corresponding full cell test result.

| | | | | | | | | Full cell | |
| | | | | | | | | | |
| | | | | | | | ICP (mol %***) | Cell thickness increase | Cycle |
| | ICP (mol %*) | | | | | | | | |
| ID | Ni | Mn | Co | S | W | Zr | Al | (%) | life** |
| CEX1.1 | 84.4 | 4.7 | 9.9 | 1.08 | 0.00 | 0.00 | 0.31 | 56.5 | 472 |
| CEX1.2 | 84.5 | 4.4 | 9.8 | 1.10 | 0.22 | 0.00 | 0.28 | 31.7 | 411 |
| EX1.1 | 84.5 | 4.4 | 9.7 | 1.17 | 0.19 | 0.07 | 0.34 | 21.1 | 520 |
| EX1.2 | 84.5 | 4.4 | 9.7 | 1.11 | 0.17 | 0.13 | 0.34 | 14.1 | 555 |
| CEX2 | 84.3 | 4.4 | 9.8 | 1.10 | 0.20 | 0.22 | 0.28 | 25.3 | 444 |

*Relative to molar contents of Ni, Mn, Co, S, W, and Zr
**Relative to molar contents of Ni, Mn, Co, S, W, Al and Zr
*** Number of cycles at 80% capacity at 45° C.

Table 2 summarizes the composition of Ni, Mn, Co, Al, W, Zr and S in examples according to the present invention EX 1.1 and EX 1.2 and comparative examples CEX 1.1, CEX 1.2 and CEX 2 and their corresponding electrochemical properties. EX 1.1 and EX 1.2 can achieve the objective of the present invention, which is to provide a positive electrode active material having an improved properties when used in a full cell including minimizing an increase in full cell thickness (i.e. bulging) and increased cycle life.

The step of WO$_3$ and Al$_2$(SO$_4$)$_3$ compound mixing followed by heat treatment in EX 1.1 and EX 1.2 link to $S_B/S_A > 1.0$ and $W_B/W_A > 1.0$, respectively, wherein $S_B$ and $W_B$ are obtained by XPS measurement and $S_A$ and $W_A$ are obtained by ICP measurement. The $S_B$ and $W_B$ higher than 0 indicates said elements are presence in the surface of the positive electrode active material as associated with the XPS measurement which signal is acquired from the first few nanometers (e.g. 1 nm to 10 nm) of the uppermost part of a sample, i.e. surface layer. On the other hand, $S_A$ and $W_A$ ratio obtained from ICP measurement is from the entire particles. The ratio of XPS to ICP ($S_B/S_A$ and $W_B/W_A$) higher than 1 indicates S and W presence mostly on the surface of the positive electrode active material.

The invention claimed is:

1. A positive electrode active material powder for lithium-ion rechargeable batteries, wherein the positive electrode active material comprises Li, M', and O, wherein M' consists of:

Ni in a content x, wherein 60.0≤x≤95.0, relative to M',

Co in a content y, wherein 0≤y≤40.0 mol %, relative to M',

Mn in a content z, wherein 0≤z≤70.0 mol %, relative to M',

W in a content a, wherein 0≤a≤4.0 mol %, relative to M',

Zr in a content b, wherein 0.01≤b≤0.20, relative to M', elements other than Li, O, Ni, Co, Mn, Al, W, S and Zr in a content c, wherein 0≤c≤2.0 mol %, relative to M', and, S in a content d, wherein 0.01≤d≤3.0 mol %, relative to M', Al in a content e wherein 0≤e≤2.0 mol %, relative to M', wherein x, y, z, a, b, c, d and e are measured by ICP, wherein x+y+z+a+b+c+d+e is 100.0 mol %, wherein the positive electrode active material has a S content $S_A$ defined as $$\frac{d}{(x+y+z+a+d)},$$

wherein the positive electrode active material has a S content $S_B$ determined by XPS analysis, wherein $S_B$ is expressed as molar fraction compared to the sum of molar fractions of Co, Mn, Ni, W, and S as measured by XPS analysis, wherein the ratio $S_B/S_A>1.0$.

2. Positive electrode active material according to claim 1, wherein 0.01 mol %≤a≤4.0 mol %, wherein the positive electrode active material has a W content $W_A$ defined as $$\frac{a}{(x+y+z+a+d)},$$

wherein the positive electrode active material has a W content $W_B$ determined by XPS analysis, wherein $W_B$ is expressed as molar fraction compared to the sum of molar fractions of Co, Mn, Ni, W, and S as measured by XPS analysis, wherein the ratio $W_B/W_A>1.0$.

3. Positive electrode active material powder according to claim 1, wherein the positive electrode active material has a W content $W_A$ defined as $$\frac{a}{(x+y+z+a+d)},$$

wherein the positive electrode active material has a W content $W_B$ determined by XPS analysis, wherein $W_B$ is expressed as molar fraction compared to the sum of molar fractions of Co, Mn, Ni, W, and S as measured by XPS analysis, wherein the ratio $W_B/W_A>1.0$.

4. Positive electrode active material according to claim 1, wherein 0.01 mol %≤d≤3.0 mol %, wherein the positive electrode active material has a S content $S_A$ defined as $$\frac{d}{(x+y+z+a+d)},$$

wherein the positive electrode active material has a S content $S_B$ determined by XPS analysis, wherein $S_B$ is expressed as molar fraction compared to the sum of molar fractions of Co, Mn, Ni, W, and S as measured by XPS analysis, wherein the ratio $S_B/S_A>2.0$.

5. Positive electrode active material according to claim 1, wherein x≥65.0 mol % and <95.0 mol %, relative to M'.

6. Positive electrode active material according to claim 1, comprising Co in a content y between 1 mol % and 20 mol %, relative to M'.

7. Positive electrode active material according to claim 1, comprising Mn in a content z between 1 mol % and 50 mol %, relative to M'.

8. Positive electrode active material according to claim 1, comprising S in a content d between 0.10 mol % and 2.00 mol % relative to M'.

9. Positive electrode active material according to claim 1, comprising W in a content a between 0.10 mol % and 3.00 mol % relative to M'.

10. Positive electrode active material according to claim 1, comprising Zr in a content b between 0.10 mol % and 0.19 mol %, relative to M'.

11. Positive electrode active material according to claim 1, comprising Al in a content e between 0.10 mol % and 1.00 mol %, relative to M'.

12. A process for the manufacturing of a positive electrode active material according to claim 1, comprising the steps of:

preparing a lithium transition metal-based oxide compound, mixing said lithium transition metal-based oxide compound with a source of a sulfur, and with water to obtain a mixture, and heating the mixture in an oxidizing atmosphere in a furnace at a temperature between 350° C. and less than 500° C., thereby obtaining the positive electrode active material.

13. A process according to claim 12, wherein a source of tungsten is added together with the source of sulfur in the mixing step.

14. A battery comprising the positive electrode active material according to claim 1.

15. An electric vehicle or a hybrid electric vehicle comprising the battery according to claim 14.

\* \* \* \* \*